United States Patent [19]

Morlock et al.

[11] Patent Number: 4,921,881
[45] Date of Patent: May 1, 1990

[54] RADIATION-HARDENABLE AGENT FOR THE SCRATCH-RESISTANT COATING OF ORGANIC GLASSES

[75] Inventors: Gerhard Morlock, Hanau; F. Werner Weigelt, Lampertheim, both of Fed. Rep. of Germany

[73] Assignee: Degussa Akteingesellschaft, Frankfurt am Main, Fed. Rep. of Germany

[21] Appl. No.: 203,100

[22] Filed: Jun. 7, 1988

[30] Foreign Application Priority Data

Jun. 23, 1987 [DE] Fed. Rep. of Germany ....... 3720671

[51] Int. Cl.$^5$ ...................... C08G 77/20; C08G 77/40; C08F 283/12
[52] U.S. Cl. ........................................ 522/99; 528/32; 528/33; 528/901
[58] Field of Search ....................... 522/99; 528/33, 32

[56] References Cited

U.S. PATENT DOCUMENTS

| | | | |
|---|---|---|---|
| 4,332,844 | 6/1982 | Hamada et al. | 528/33 |
| 4,387,240 | 6/1982 | Berg | 522/81 |
| 4,444,973 | 4/1984 | Schönfelder et al. | 528/32 |
| 4,454,295 | 6/1984 | Wittmann et al. | 522/99 |
| 4,626,556 | 12/1986 | Nozue et al. | 528/32 |

*Primary Examiner*—John C. Bleutge
*Assistant Examiner*—Susan Berman
*Attorney, Agent, or Firm*—Cushman, Darby & Cushman

[57] ABSTRACT

A radiation-hardenable agent for the scratch-resistant coating of organic glasses consists of a cocondensate of vinyl trimethoxysilane or vinyl triethoxysilane and tetramethoxysilane or tetraethoxysilane, a reactive diluent which comprises at least 2 vinyl, acrylic or methacrylic groups per molecule and, if necessary, of a known photoinitiator. The agent can be prepared by forming the cocondensate in the presence of an amount of water which is at least equivalent to the methoxy or ethoxy groups present or in the presence of a small amount of a carboxylic acid, removing all volatile portions of the reaction mixture and mixing the oily siloxane remaining as residue with the other components.

6 Claims, No Drawings

RADIATION-HARDENABLE AGENT FOR THE SCRATCH-RESISTANT COATING OF ORGANIC GLASSES

The invention relates to a radiation-hardenable agent for the scratch-resistant coating of organic glasses, consisting of
(A) 82 to 64% by weight of a cocondensate prepared by the cocondensation of
  (A1) 90 to 65% by weight vinyl trimethoxysilane or vinyl triethoxysilane or a mixture of these two silanes and
  (A2) 10 to 35 weight percent of tetramethoxysilane or tetraethoxysilane or a mixture of these two silanes.
(B) 9 to 27% by weight of at least one reactive diluent comprising at least 2 vinyl, acrylic or methacrylic groups per molecule and
(C) 0 to 9% by weight of at least one known photoinitiator, the components (A), (B) and (C) totalling 100% by weight.

The invention also relates to methods of preparing this agent.

The agent of the invention is particularly suitable for improving the surface of organic glasses based on polymethylmethacrylate, polycarbonate and poly-(diethylene glycol-bis-allyl carbonate) (CR 39). It can be hardened by means of electron beams and does not require the addition of component (C) in that case. However, if the hardening is to be performed by means of ultra-violet radiation, component (C) is required.

Component (A) is a cocondensate prepared by the cocondensation of 90 to 65% by weight vinyl trimethoxysilane or vinyl triethoxysilane of a mixture of these two silanes and 10 to 35% by weight tetramethoxysilane or tetraethoxysilane or a mixture of these two silanes. It is especially advantageous if the ratio of vinyl groups to silicon atoms in component (A) is between 0.5:1 and 0.92:1, preferably between 0.75:1 and 0.85:1.

Component (B) is a so-called reactive diluent which comprises at least 2 vinyl, acrylic or methacrylic groups per molecule and is capable of forming a cross-linked copolymerizate with the vinyl groups of component (A). Suitable reactive diluting agents for component (B) are e.g. pentaerythritol triacrylate, pentaerythritol tetraacrylate, butane diol-1,4-diacrylate, hexane diol-1,6-diacrylate, ethylene glycol diacrylate, diethylene glycol diacrylate, triethylene glycol diacrylate, tripropylene glycol diacrylate, trimethylol propane triacrylate and the corresponding methacrylates; divinyl compounds such as divinyl benzene, and trivinyl compounds.

It is advantageous in many instances if a mixture of several such reactive diluents is used as component (B). It is especially advantageous if 1 to 10% by weight of component (B) contains at least one free hydroxyl group per molecule. Especially preferred mixtures of reactive diluents are those consisting of pentaerythritol triacrylate and hexane diol-1,6-diacrylate, especially when the weight ratio is approximately 2:1.

Component (C) must also be present in agents according to the invention which can be hardened by ultraviolet radiation, preferably in an amount of 7 to 9% by weight of the entire agent. Suitable known photoinitiators which can be used are e.g. benzoin ethers such as methyl benzoin ether, ethyl benzoin ether, isopropyl benzoin ether or n-butyl benzoin ether; 2,2-dialkoxy acetophenones and 2,2-dialkoxy-2-phenyl acetophenones; 2-hydroxy-2,2-substituted acetophenones such as 2-hydroxy-2-phenyl propiophenone, 2-hydroxy-2,2-dimethyl acetophenone or 1-benzoylcyclohexane-1-ol; benzophenones such as 4-chlorobenzophenone, 4-phenyl benzophenone, 4,4-bis-(diethyl amino)-benzophenone or 4-p-tolyl thiobenzophenone; condensed ring benzophenone derivatives such as fluorenone, 2-methyl anthroquinone, dibenzosuberone, 2-chlorothioxanthone, 2-methyl thioxanthone, 2-isopropyl thioxanthone or 2,4-diethyl thioxanthone; benzil and 3-keto-substituted cumarins. 2-hydroxy-2,2-dimethyl acetophenone preferably is added into the reactive diluent (mixtures) as photoinitiator.

The agents of the invention can be prepared by initiating the cocondensation of components (A1) and (A2) by adding 1 to 1.3 moles water per mole of methoxy groups and ethoxy groups present. The preparation is completed by heating the reaction mixture under reflux, and completely removing the volatile portions of the reaction mixture under reduced pressure. The oily polysiloxane remaining as residue is then homogeneously mixed with component (B) and, if necessary, with component (C).

Alternatively, the agents of the invention can also be prepared by initiating cocondensation of components (A1) and (A2) by adding 0.5 to 0.8% by weight, in relation to the total weight of components (A1) and (A2), of a carboxylic acid which contains 2 to 8 carbon atoms, preferably acetic acid. The reaction is completed by heating the reaction mixture under reflux and the volatile portions of the reaction mixture are once again completely removed under reduced pressure. The oily polysiloxane remaining as residue is then homogeneously mixed with component (B) and, if necessary, with component (C).

Regardless of whether the cocondensation of components (A1) and (A2) is performed in the presence of water or in the presence of a carboxylic acid, a complete cocondensation requires a maximum of four hours of heating under reflux. However, one to two hours of heating is generally sufficient.

The agents of the invention can be used in an undiluted state for the coating of organic glasses. If a lower viscosity is desired, they can also be diluted with approximately 5 to 25% by weight of a suitable solvent, e.g. isobutanol. They are applied to the organic glass to be coated in accordance with known methods such as flooding, immersion or spraying and then hardened by means of electron beams or by ultraviolet radiation. The wet-coat thickness ranges in general between 0.5 and 20 μm. The final hardness is normally achieved after a maximum of 24 hours storage.

The invention will now be explained in more detail in the following examples. Parts and percent data signify parts by weight and percentage by weight unless otherwise indicated.

The coatings applied and hardened in the examples were tested with a grid tester of the Erichsen Company according to DIN 53 151 for adhesion and with a Gardener Hazemeter, type XL 211, after 100 cycles abrasion with a Taber abrader at 1 kg load on a CS-10F friction wheel according to ASTM D 1044 for scratch resistance. The characteristic grid values and the values for ▲ % haze are presented in Table 3.

EXAMPLE 1

A mixture of 80 parts vinyl trimethoxysilane, 20 parts tetraethoxysilane and 54 parts water was heated for 2 hours under reflux. After the reaction mixture had cooled off, the resulting mixture of water, methanol and ethanol was completely removed under a water-jet vacuum. The oily residue was homogeneously mixed with a mixture of 13.3 parts pentaerythritol triacrylate and 6.6 parts hexane diol-1,6-diacrylate. 8 parts 2-hydroxy-2,2-dimethyl acetophenone (Merck AG, Darmstadt) was evenly mixed into 92 parts of this mixture. The finished coating composition was applied with a wiper in a layer thickness of 10 μm onto polycarbonate plates (9 cm×9 cm) and hardened under a ultraviolet lamp (IST system) at a speed of 2 m/minute.

EXAMPLE 2

A mixture of 100 parts vinyl trimethoxysilane, 25 parts tetraethoxysilane and 1 part glacial acetic acid (98%) was heated for 2 hours under reflux. After the reaction mixture had cooled, all volatile components were completely removed under a water-jet vacuum. The oily residue was homogeneously mixed with a mixture of 25 parts pentaerythritol triacrylate and 12.5 parts hexane diol-1,6-diacrylate. 10 parts of 2-hydroxy-2,2-dimethyl acetophenone were uniformly mixed into 115 parts of this mixture. The finished coating composition was applied with a wiper in a layer thickness of 10 μm onto polymethylmethacrylate plates (9 cm×9 cm) and hardened as in Example 1.

EXAMPLES 3 to 6

Various mixtures of vinyl trimethoxysilane (VTMO) or vinyl triethoxysilane (VTEO) and tetramethoxysilane (TMO) or tetraethoxysilane (TEO) were cocondensed in an analogous manner to Example 1 and processed further as in Example 1 to a finished coating composition which was applied with a wiper in a layer thickness of 10 μm onto polymethylmethacrylate plates (9 cm×9 cm) and hardened as in Example 1. The results are given in Table 1.

TABLE 1

| Example | (data in parts by weight): | | | |
|---|---|---|---|---|
| | VTMO | VTEO | TMO | TEO |
| 3 | 80 | — | — | 10 |
| 4 | 80 | — | 10 | — |
| 5 | — | 80 | 40 | — |
| 6 | — | 80 | — | 40 |

EXAMPLES 7 to 10

The cocondensate of Example 1 was mixed with variously compounded mixtures of pentaerythritol triacrylate (PETA) and hexane diol-1,6-diacrylate (HDDA) and processed further as in Example 1 to a finished coating composition which was applied with a wiper in a layer thickness of 10 μm onto polycarbonate plates (9 cm×9 cm each) and hardened as in Example 1.

TABLE 2

| Example | (data in parts by weight): | |
|---|---|---|
| | PETA | HDDA |
| 7 | 10 | 10 |
| 8 | 20 | 10 |
| 9 | 20 | 3 |
| 10 | 20 | 15 |

EXAMPLE 11

The cocondensate of Example 2 was homogeneously mixed with a mixture of 20 parts pentaerythritol triacrylate and 10 parts tripropylene glycol diacrylate. 10 parts 2-hydroxy-2,2-dimethyl acetophenone were evenly mixed into 115 parts of this mixture. The finished coating composition was applied with a wiper in a layer thickness of 10 μm onto polycarbonate plates and polymethylmethacrylate plates (9 cm×9 cm each) and hardened as in Example 1. The results are given in Table 3.

Table 3 (abrasion ▲ % haze) and characteristic grid values (GT) of the coatings on polycarbonate (PC) and polymethyl-methacrylate (PMMA)):

| Example | on PC | | on PMMA | |
|---|---|---|---|---|
| | ▲ % | haze GT | ▲ % | haze GT |
| 1 | 2.1 | — | — | — |
| 2 | — | — | 2.0 | — |
| 3 | — | — | 2.9 | 0 |
| 4 | — | — | 3.5 | — |
| 5 | — | — | 3.4 | 0 |
| 6 | — | — | 3.8 | 0 |
| 7 | 5.4 | 0 | 3.0 | 0 |
| 8 | 2.1 | 0 | 1.7 | 0 |
| 9 | 2.6 | 2 | — | — |
| 10 | 2.8 | 0 | — | — |
| 11 | 1.5 | 1-2 | 2.7 | 0 |

What is claimed is:
1. A radiation-hardenable agent for the scratch-resistant coating of organic glasses, consisting essentially of
(A) 82 to 64% by weight of a cocondensate prepared by the cocondensation of
(A1) 90 to 65% by weight of a member of the group consisting of vinyl trimethoxysilane, vinyl triethoxysilane and mixtures of these two silanes and
(A2) 10 to 35% by weight of a member of the group consisting of tetramethoxysilane, tetraethoxysilane and mixtures of these two silanes
(B) 9 to 27% by weight of at least one reactive diluent comprising at least 2 vinyl, acrylic or methacrylic groups per molecule and
(C) 0 to 9% by weight of at least one known photoinitiator, the total amount of components (A), (B) and (C) being 100% by weight.
2. A radiation-hardenable agent as set forth in claim 1 in which the ratio of vinyl groups to silicon atoms in component (A) is between 0.5:1 and 0.92:1.
3. A radiation-hardenable agent according to claim 2 in which the ratio of vinyl groups to silicon atoms in component (A) is between 0.75:1 and 0.85:1.
4. A radiation-hardenable agent according to any one of claims 1 to 3 in which 1 to 10% by weight of component (B) comprises at least one free hydroxyl group per molecule.
5. A radiation-hardenable agent according to any one of claims 1 to 3 in which component (B) is a mixture of pentaerythritol triacrylate and hexane diol-1,6-diacrylate.
6. A radiation-hardenable agent according to any one of claims 1 to 3 in which the amount of component (C) is 7 to 9% by weight, said agent being hardenable by means of ultraviolet radiation.

* * * * *